(12) United States Patent
Gopal et al.

(10) Patent No.: US 7,987,159 B2
(45) Date of Patent: Jul. 26, 2011

(54) DETECTING AND MANAGING CHANGES IN BUSINESS DATA INTEGRATION SOLUTIONS

(75) Inventors: Burra Gopal, Redmond, WA (US); Oleg Gregory Ovanesyan, Redmond, WA (US); Rahul Kapoor, Redmond, WA (US); Parul Manek, Redmond, WA (US); Sandhya Jain, Redmond, WA (US); Muthiah K. Annamalai, Redmond, WA (US); Sharon E. Edelstein, Redmond, WA (US); Peiwei Cao, Redmond, WA (US); Alexandru Croicu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 661 days.

(21) Appl. No.: 11/521,709

(22) Filed: Sep. 15, 2006

(65) Prior Publication Data
US 2008/0071844 A1     Mar. 20, 2008

(51) Int. Cl.
G06F 7/00      (2006.01)
G06F 17/00     (2006.01)

(52) U.S. Cl. ...................................................... 707/687

(58) Field of Classification Search ........... 707/999.002, 707/687
See application file for complete search history.

(56) References Cited

U.S. PATENT DOCUMENTS

| | | | |
|---|---|---|---|
| 6,839,724 B2 | 1/2005 | Manchanda et al. | 707/203 |
| 6,973,556 B2 | 12/2005 | Milligan et al. | 711/202 |
| 7,167,844 B1 * | 1/2007 | Leong et al. | 705/80 |
| 2003/0046639 A1 | 3/2003 | Fai et al. | 715/513 |
| 2003/0097345 A1 | 5/2003 | Upton | 705/401 |
| 2004/0044987 A1 | 3/2004 | Kompalli et al. | 717/100 |
| 2004/0194069 A1 | 9/2004 | Surasinghe | 717/136 |
| 2005/0216498 A1 | 9/2005 | Georgalas et al. | 707/102 |
| 2006/0004595 A1 | 1/2006 | Rowland et al. | 705/1 |

(Continued)

FOREIGN PATENT DOCUMENTS

EP      1376337      1/2004

OTHER PUBLICATIONS

Craig A.N. Soules et al., Carnegie Mellon University, "Metadata Efficiency in Versioning File Systems," published in Proccedings of FAST '03: 2$^{nd}$ USENIX Conference on File and Storage Technologies, San Francisco, CA, USA, pp. 43-58, Mar. 31-Apr. 2, 2003.

(Continued)

*Primary Examiner* — Kimberly Lovel
(74) *Attorney, Agent, or Firm* — Merchant & Gould P.C.

(57) ABSTRACT

Methods, systems, and computer program products detect and manage changes in business data integration (BDI) solutions. BDI solutions include extracting, mapping, or loading source information from disparate sources as targets presented to business applications that consume targets. A method involves detecting changes in a BDI solution, classifying each of the changes based on change severity, analyzing what objects would be impacted by the changes, determining whether the objects impacted by the changes can be change handled without user intervention, and change handling without user intervention all the objects impacted by changes that are not severe. Still further, the method involves committing changes to a metadata repository and creating a deployable checkpoint of the metadata repository where the deployable checkpoint is consistent for all the changes handled in the BDI solution. The modularized metadata describes an end-to-end information flow and underlying dependencies between the source information, mappings, targets and business applications.

17 Claims, 7 Drawing Sheets

U.S. PATENT DOCUMENTS

2006/0064666 A1    3/2006    Amaru et al. ................. 717/100
2006/0070068 A1    3/2006    Chandel ........................ 718/100
2006/0271528 A1*   11/2006   Gorelik ............................ 707/3

OTHER PUBLICATIONS

David Loshin, "Business Models and Information Flow," Business Intelligence: The Savvy Manager's Guide: Getting Onboard with Emerging IT, pp. 59-73; published by Morgan Kaufmann Publishers, San Francisco, CA, © 2003 by Elsevier Science.

Microsoft Technet, "Using Microsoft Tools for Business Process Management," May 3, 2005; Website: http://www.microsoft.com/technet/prodtechnol/biztalk/biztalk2004/planning/bpm-solution-overview.mspx.

* cited by examiner

DETECTING AND MANAGING CHANGES IN BUSINESS DATA INTEGRATION SOLUTIONS

BACKGROUND

Business Data Integration (BDI) is a process where information from one or more sources in various source systems is extracted, mapped together, transformed, cleansed, and presented as targets directly consumable by source-independent business applications. The business applications are not intimately aware of the various source systems. The process of extracting, mapping, and presenting source information to applications that are source-independent is also called Extraction, Transformation and Loading (ETL) in the computer industry. Sources of information may include line of business (LOB) systems or databases that expose information through standard protocols. Sources may also include webservers that expose data through web-services. A BDI solution is considered to be an ETL process along with targets and business applications that consume the results of the ETL process.

Conventional solutions implement integration of information from disparate sources by writing code explicitly using procedural languages to produce the integration programs. When BDI is implemented using procedural programming techniques, the integration process has to rely on a person (human) who is familiar with the integration program to manually update procedural code. This is obviously not geared towards a business user who is not familiar with programming. References to information use a human-readable-name. Thus, if a piece of information changes, related pieces of information are not guaranteed to be unique and tractable in the system. Source systems, as described above, are outside the influence of business applications that are source-independent. Hence, source information can change without a business application being changed simultaneously. These changes are of numerous kinds, for example a table's schema could change, an API signature could change, or even, new data could be added to a table that is not yet mapped to any business application content or behavior.

Some conventional tools have more declarative ways of implementing integration by using UI-driven tools or other techniques geared towards a non-programmer. These more declarative tools can help users understand how to modify transformation processes when source information changes, but they cannot help determine how to modify the consuming business application's behavior. The more declarative tools also, cannot solve the problem of changing business application requirements and mapping the new requirements to existing source information.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments of the present invention solve the above and other problems by providing for detecting and managing changes in Business Data Integration (BDI) Solutions. Embodiments of the present invention provide one or more mechanisms that reconcile or help to reconcile a source information change with how the source information is used in information flow all the way up to use in business applications. Embodiments also propagate requirements from business applications to mappings required to obtain source information from source systems. These mechanisms are targeted towards a business user who is not familiar with programming in order to facilitate reconciliation of changes in end-to-end information flows including top-down and bottom-up information flows. Top-down information flows propagate requirements from business applications to information sources and bottom-up information flows propagate source information from information sources to business applications. Targeting the business user who is not familiar with programming minimizes or eliminates the need for user or human intervention, helps manage changes, and reduces a Total-Cost-of-Ownership (TCO) in a BDI solution.

Embodiments of the present invention include a change detection management (CDM) service that automates change detection and management for BDI solutions. This CDM service uses shredded or modularized metadata that granularly describes an end-to-end information flow and associated underlying dependencies between source information, mappings, target information and business applications. The CDM service also defines tools to manipulate the metadata, and plugs in handlers for changes at various points in the end-to-end information flow. Moreover, for specific kinds of changes, the CDM service automatically updates the end-to-end information flows without explicit user intervention.

These and other features and advantages will be apparent from a reading of the following detailed description and a review of the associated drawings. It is to be understood that both the foregoing general description and the following detailed description are explanatory only and are not restrictive of the invention as claimed.

DETAILED DESCRIPTION

As briefly described above, embodiments of the present invention are directed to detecting and managing changes in business data integration (BDI) solutions. In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the invention. The following detailed description is therefore not to be taken in a limiting sense, and the scope of the present invention is defined by the appended claims and their equivalents.

Embodiments of the present invention reduce the cost of developing and maintaining and upgrading BDI solutions when there are changes to source or destination system information, or to the mappings between them. The invention implements a declarative, metadata-driven approach to maintaining and upgrading BDI solutions. The approach is to abstract all objects, or artifacts, and relationships that take part in BDI solutions, track how and when they change, and display what has changed in an intuitive way by organizing the changes according to the objects that are affected. The approach also tracks the business area in which the objects exist, derives possible user actions that are needed to manage the change based on registration of such actions, and possibly updates the affected objects or relationships automatically when the changes are simple or non-severe enough to be merged or applied without any human or user intervention.

It should be appreciated that the diminished need for explicit human intervention to handle non-severe, non-structural, changes is beneficial. This feature is made possible due to a modularized metadata representation of all objects and relationships that are needed to generate packages and the de-coupling of package generation software from the user-interfaces and tools required to make the modifications to the objects and relationships. When structural changes occur in a BDI solution, embodiments of the present invention provide a guided change management process. Once the changes are handled, integration services packages are generated, for example in bulk, for deployment, thus significantly reducing manual work.

Figure 1:
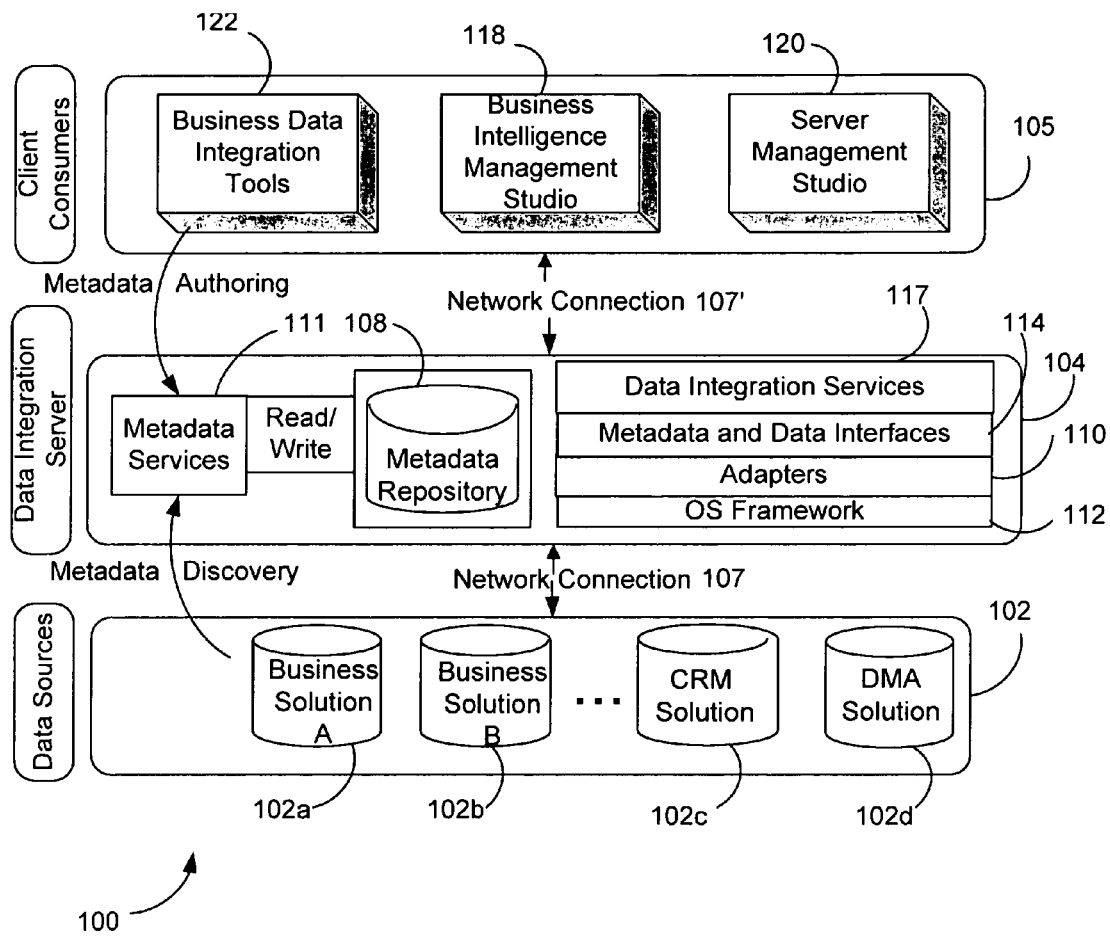
FIGS. 1, 1a, and 1b illustrate operating environment architecture and a modularized metadata configuration according to an illustrative embodiment of the present invention.

FIG. 1 illustrates operating environment architecture 100 of a BDI solution according to an illustrative embodiment of the present invention. The operating environment architecture 100 includes data sources 102, a data integration server 104 and client computers or consumers 105. The data sources 102 may include line of business (LOB) systems 102a and 102b such as SAP R/3 and/or SAP BW from SAP America Inc. of Newtown Square, Pa. The data sources 102 may also include customer relationship management (CRM) solution data source 102c such as SIEBEL from ORACLE Corporation of Redwood Shores, Calif. or data management and analysis (DMA) solution data source 102d such as SQL SERVER 2005 from MICROSOFT Corporation of Redmond, Wash. Other data sources 102 could include databases or web services. Source information includes tables, views, stored procedures, and/or web services as well as other objects. The data sources 102 interface with the data integration server via a network connection 107.

The data integration server 104 is a middleware layer including a metadata repository 108, metadata interfaces 114, an operating system (OS) framework 112, such as a .NET framework from MTCROSOFT CORPORATION, data integration services 117 such as SQL SERVER integration services (SSIS) in SQL SERVER 2005, and adapters 110 for converting LOB data and metadata to a standard abstractions or formats such as ACTIVE DATA OBJECT (ADO) from Microsoft Corporation or web services standards from W3C. The data integration server 104 further includes metadata services 111 which communicate with LOB systems and data sources 102 to facilitate metadata authoring and metadata discovery. The metadata services 111 extract tables and relationships as a BLOB or an opaque object and converts the object to modularized metadata as illustrated in FIGS. 1a and 1b.

Figure 1A:
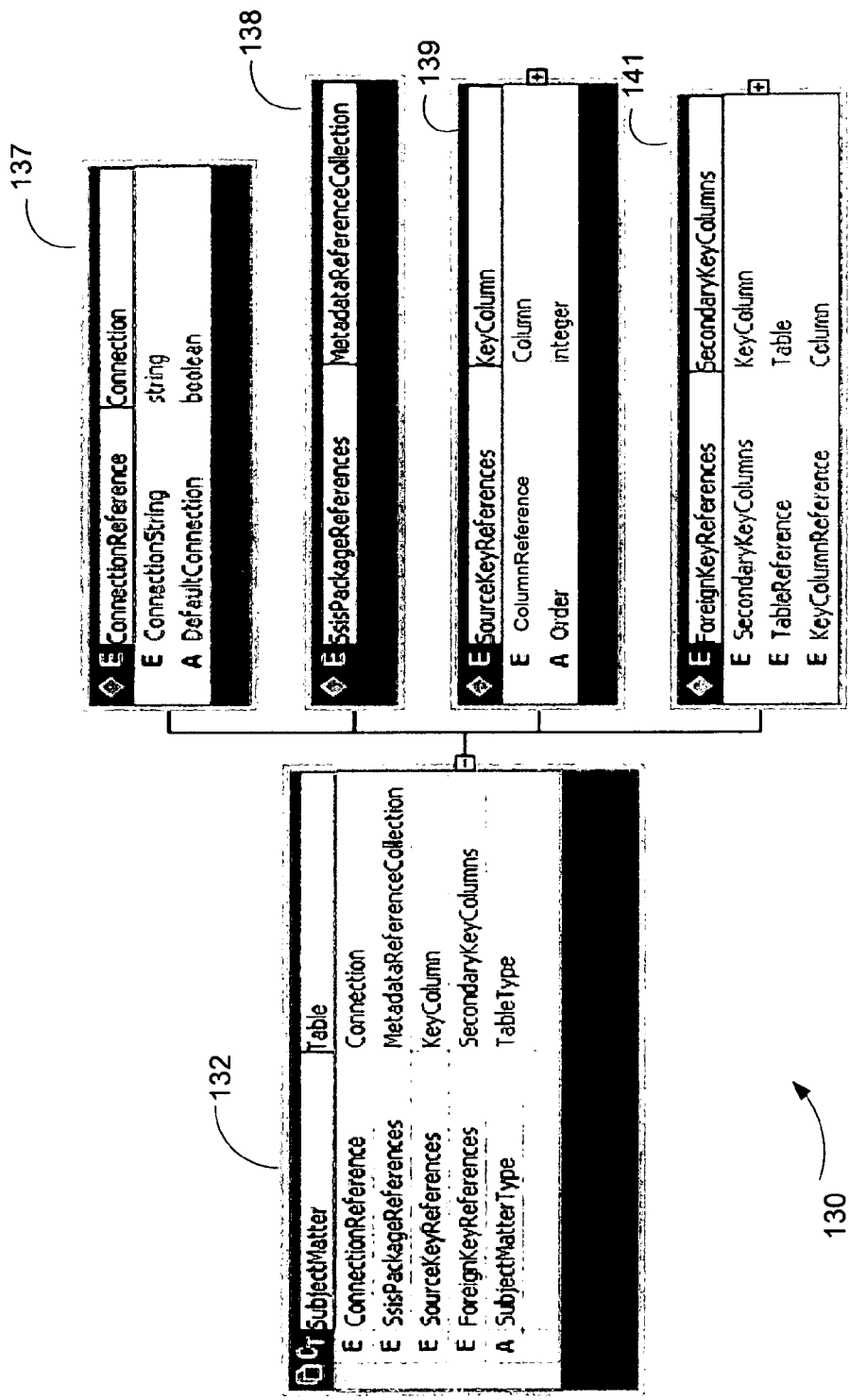
Figure 1B:
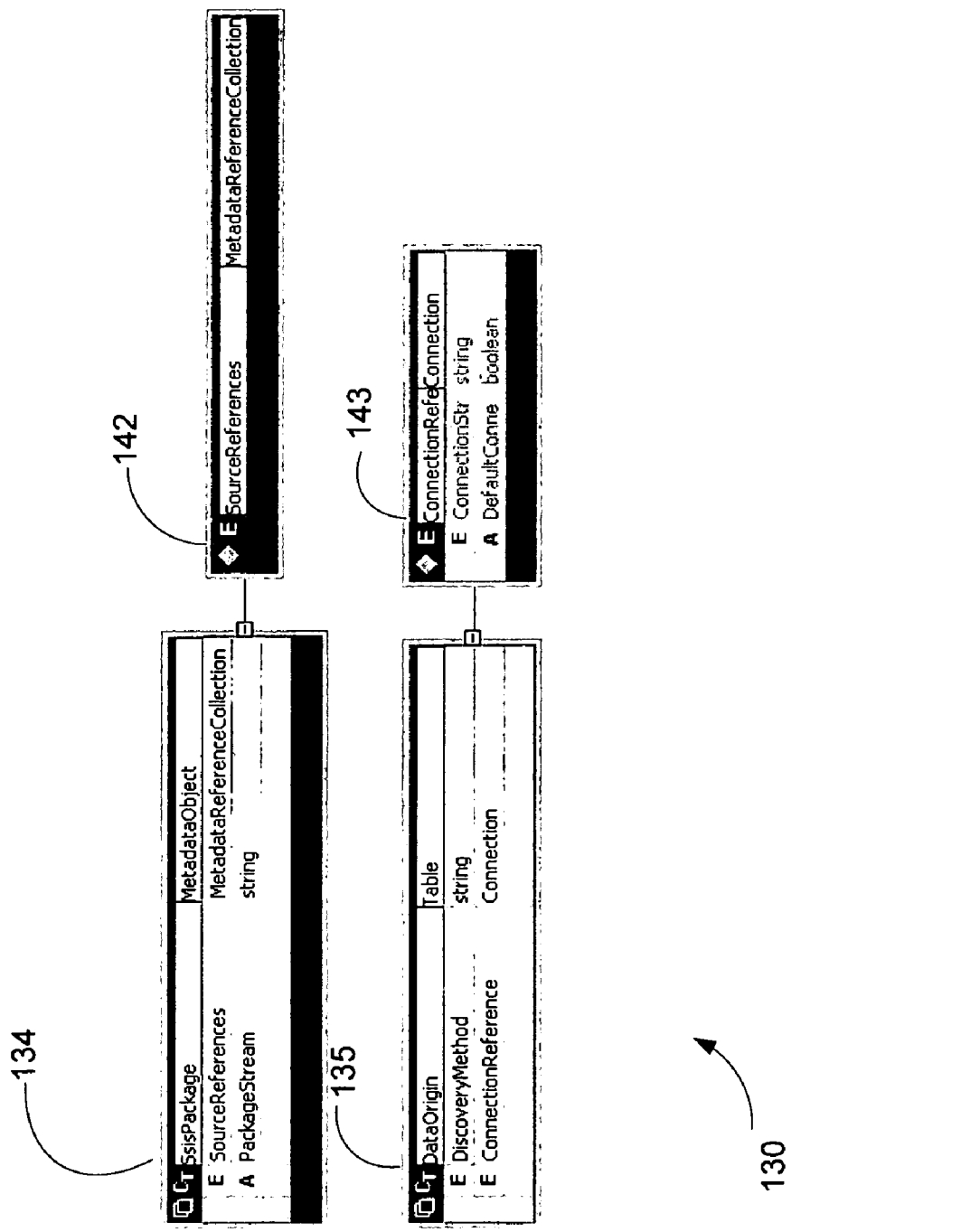

FIGS. 1a and 1b illustrate an example of shredded or modularized metadata 130 that resides in the metadata repository 108. The metadata services 111 reads and writes modularized metadata to and from the metadata repository 108. The modularized metadata 130 includes main tables 132, 134, and 135 respectively associated with granular tables 137, 138, 139, 141, 142, and 143. Referring to FIGS. 1, 1a-1b, and 2a-2b, the data integration server 104 also includes a change detection management (CDM) service (shown in FIG. 2a). Additional details regarding the CDM service will be described below with respect to FIGS. 2a-4. The metadata repository 108 houses shredded or modularized metadata 130 representing all business objects involved in BDI solutions. These business objects may include source systems, target systems such as a data warehouse or staging areas, source information, and target information such as cubes data marts, views, row-to-row mappings, custom hierarchies over existing source object hierarchies.

Still other business objects represented by the metadata include connection information, transformation information, BDI business application models, and references to information. Connection information includes ways to connect to the data source or target system to obtain a given piece of source or target information. Transformation information includes, for example, column-column mappings, table/view join expressions and other queries, and XSLTs. BDI business application models are collections of end user consumable targets and BDI solutions are a combination of one or more of source systems and BDI business application models. References to information include explicit references in shredded metadata to represent all related information wherever possible, including other objects in shredded metadata, instead of using a human-readable-name. Thus, if a piece of information changes, the CDM service can examine all the related pieces of information by following the references, and if needed, recursively examine and retrieve the references from these related pieces of information as well to build a list of all the affected pieces of information. The references are guaranteed to be unique, and are tractable in the system, as opposed to human-readable-names that may not be unique and are not tractable.

The client consumers 105 include one or more client computers with tools for interfacing with a SQL server via a network connection 107'. The tools for interfacing with the data integration server 102 and the data sources 102 may include a business intelligence management studio 118, a server management studio 120, and business data integration tools 122.

Figure 2A:
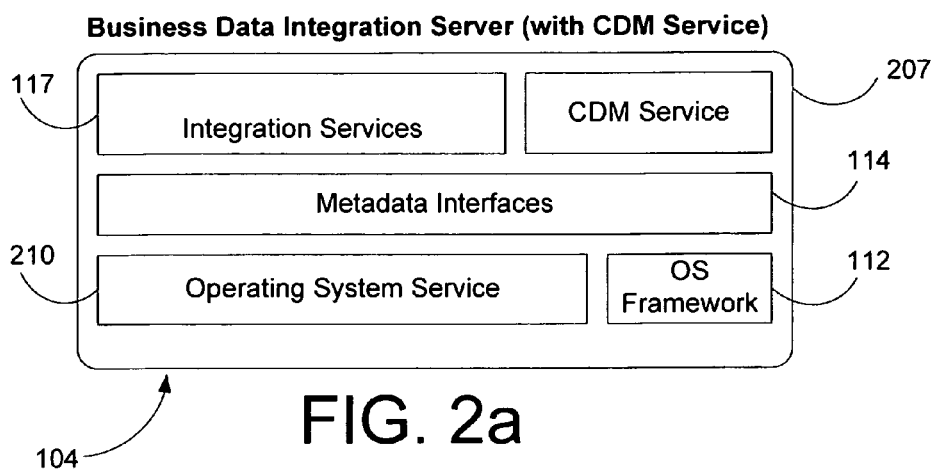
FIGS. 2a-2b illustrate a data integration server architecture and a graphical representation of workflow.
Figure 2B:
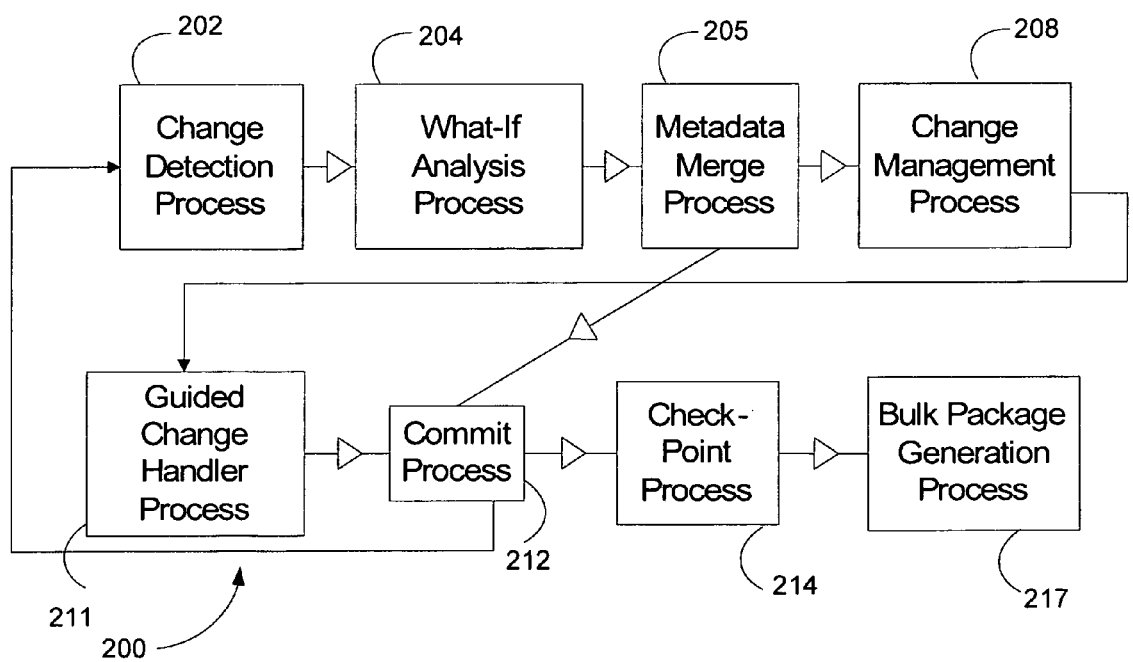

FIGS. 2a and 2b illustrate the data integration server 104 architecture and a graphical representation of workflow 200 for the CDM service 207. The data integration server 104 further includes an operating system service 210 such as WINDOWS SERVER 2003 from MICROSOFT CORPORATION, and the CDM service 207. The CDM service 207 detects and manages changes in the BDI solution. The metadata stored in the metadata repository 108 describes an end to end information flow and underlying dependencies between the source information, mappings, the targets and the source-independent business applications 105. Change handlers for each business object that has changed or pair of related or dependent business objects are represented by metadata and pluggably-registered. For example, transformations are related to the data sources 102 and destinations of the transformations, BDI business application models are related to the consumable target information, source information depends on the data source 102 it comes from, and target information depends on the target system in which the target information will be produced. Metadata objects are also versioned when changes are made to them.

Referring now to FIG. 2b, the graphical representation of workflow 200 of the CDM service 207 will be described. In this scenario, when a user browses the data sources 102, for instance LOB source systems, the user may discover metadata for source system objects that is needed for his/her BDI solutions. A discovery process compares metadata of source objects in the existing LOB system with assumed definitions of source objects in the metadata repository 108. These assumed definitions are either imported or discovered earlier from the same LOB systems, or authored as pre-defined content of the metadata and installed as a part of setting up the system for first-time use.

A Change-Detection process 202 classifies the changes according to their severity. The CDM service 207 identifies changes to objects and relationships using the shredded metadata representation and classifies the type of change. The types of changes include a non-structural change, additions, modifications, and deletions. Non-structural changes include renaming, column order changes in a table, and connection. Additions include new additions to the existing object schemas or instance data. Modifications are changes to the object schemas and instance data. For example, modifications may include a type of an element for an object increases or decreases in size such as an integer becoming a long integer or a string of twenty characters becoming a string of forty characters. Other modification examples include a type of an element changes such as an integer becoming a string, data of a row changing in a primary key, data of a row changing in a foreign key, and data or a row changing in non-key fields. Also, deletions are deletions of object schemas or instance data.

Next, a What-If Analysis process 204 can be used optionally to figure out the scope of the change with respect to the rest of the metadata repository if a certain change is accepted. This gives the user a first glance at what he or she might have to do going forward based on how the change affects other metadata. The What-If Analysis process 204 also allows the user to reject the change completely and thereby permit follow-up with the person or system that made the change and revert back or make another change instead. Thus, by scoping a change to a given shredded-metadata object to relevant high-level business objects that affect BDI solutions, business objects that are impacted by the change are retrieved.

A Metadata merge process 205 automatically fixes or merges objects, relationships and mappings for changes that are not severe (non-structural). The Metadata merge process 205 does not commit this information to the metadata repository right away. For non-structural changes, the workflow 200 can proceed straight to the Commit Process 212 described below and bypass manual handling of changes. For structural changes, the workflow 200 proceeds to a Change Management process 208 and a Guided Change Handling process 211 described below. It should be appreciated that once the Commit process 212 executes, the workflow 200 can return to the Change Detection Process 202 to handle more changes and also proceed to a Checkpoint process 214 described below. This loop repeats until all changes are properly handled.

Next, a Change Management process 208 displays changes, both severe and non-severe, to the user. The changes are organized by the business area, the kind of object, and the kind of change. The Change Management process 208 also displays whether a corrective action has been taken already by the system and if so displays the action. Also, corrective actions that need to be taken can be displayed based on registered actions for a certain type of change associated with a certain object. Thus, the CDM service 207 identifies actions that can be taken for a given type of change to a business object, guides the business user through the changes, and invokes a handler for the object. The CDM service 207 also identifies all actions that can be taken for each pair of affected objects and changes for which the business user wants to process changes, guides the business user through the changes, and invokes the handler for the pair of objects.

A Guided change handler process 211 launches a user-interface for each change-handler described above. Once the user makes the change, the Guided change handler process 211 updates the state of the system to reflect the changes that have been taken care of, and the changes yet to be handled. When a user is not pleased with the automatic handling of certain changes, the Guided change handler process 211 provides an opportunity for the user to fix or update the changes in a manual fashion using tools of his or her choice. Here the CDM 207 refreshes a list of changed objects and relationships once the changes have been processed and guides the user so that all the changes are resolved and BDI solutions are regenerated based on the changes accepted by users.

A Commit process 212 executes when the user explicitly invokes the Commit process 212 to commit the changes of a business object to the metadata repository 108. The Commit process 212 creates new versions of all changed objects and remembers the type of change that occurred on each object. The Commit process 212 also remembers the reason or cause of the change and the user making the change for auditing or tracking purposes. A user may invoke this process when all changes to the business object have been tested.

Next, a Check Point process 214 executes when the user explicitly invokes the process when changes to all affected business objects such as data, schemas, relationships, and mappings, have been committed and tested. This process creates a deployable checkpoint of the metadata repository 108 that is consistent for all the changes that have been made to the system. Here the CDM 207 takes a checkpoint of the new BDI solution as the collection of new versions of all the relevant metadata objects in shredded metadata. Thus, a user can revert to a saved solution checkpoint at a later time. Without check pointing a collection of objects in a solution as a new solution version, a user has to manually revert to the correct version of each object that was verified in the past to have worked correctly. This can be difficult when many versions are created over the life cycle of the solution. Check pointing reduces the total cost of ownership.

The package generation process, such as the Bulk package generation process 217 starts after the changes are validated and check-pointed. This process looks for all changed target objects and regenerates integration services packages, for example SSIS packages, for all such targets at one shot. This is accomplished by feeding the modified and validated mappings, with possibly new source object schemas, to the package generation software. For example, SQL server integration services (SSIS) packages are generated after all the changes are accepted and committed, so that the SSIS packages can be deployed at one shot without explicit user interaction and editing of those packages. The Bulk package generation process 217 is used for automatic deployment of packages. The "manual" work left to do after the Commit process 212 is to deploy the packages that have been generated in the last stage of the workflow.

Other scenarios that may initiate the workflow 200 include target schema import or authoring and source-target mapping authoring. Target schema import or authoring provides for the user to either author the target schema definitions or import target schema definitions from another system. For example, the models (dimensions and fact schemas) that need to be populated by the BDI process are either authored manually using tools such as the DATA SOURCE VIEW (DSV) designer in SQL Server Analysis Services, or imported from tools like business modeler that is used in the BIZSHARP product from MICROSOFT CORPORATION. Source-target mapping authoring involves a user modifying the mapping between source system information and targets. This is typically done using tools like SQL Expression Builder (that ships in products such as MICROSOFT ACCESS or SQL Server), and BizTalk mapper (that ships in the BizTalk server). This changes the linkage between source and target systems and requires the changes to be managed and validated. Additional details regarding the logical capabilities of the CDM service 207 will be described below with respect to FIGS. 3-4.

Figure 3:
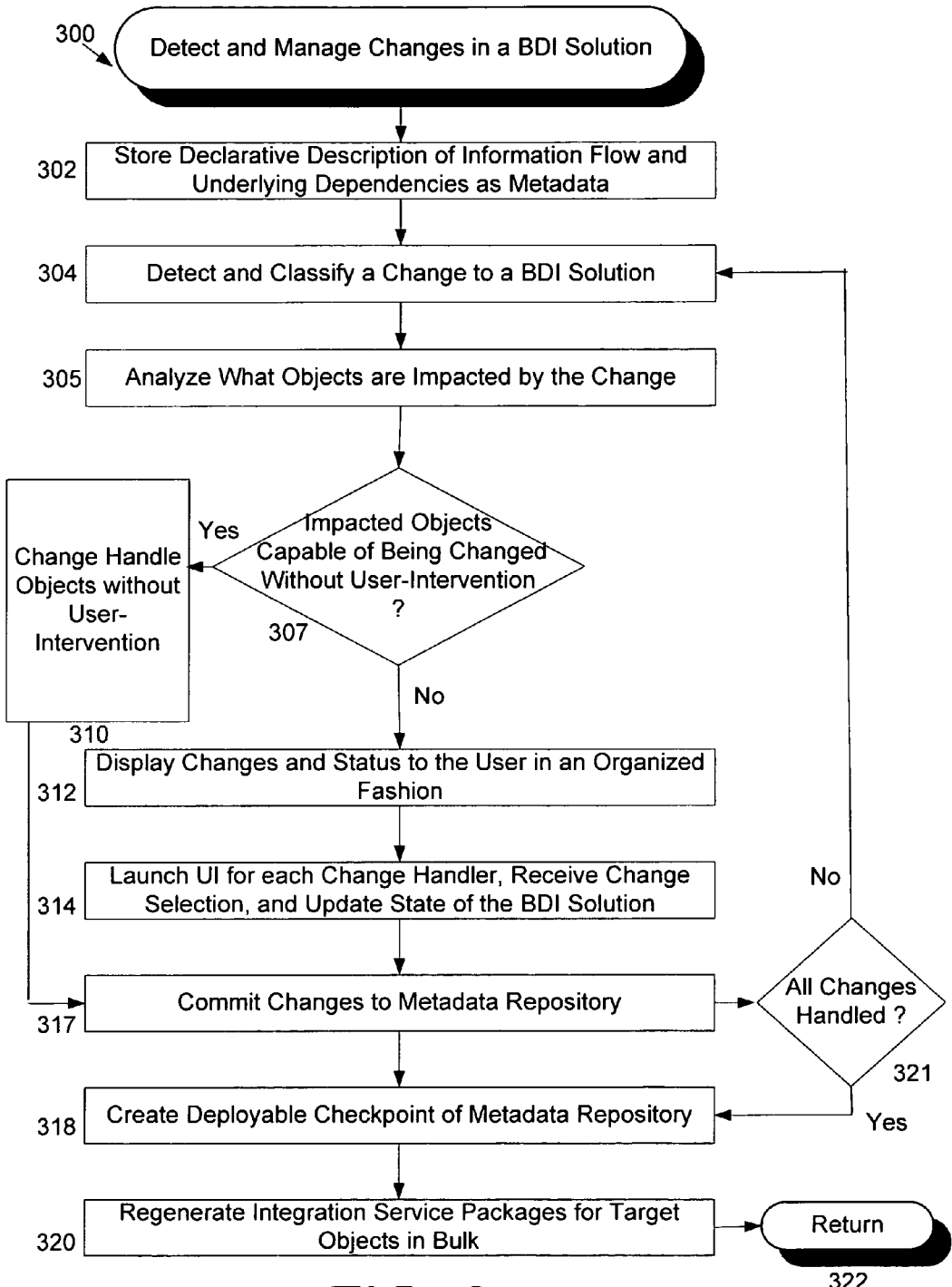
FIG. 3 is an illustrative routine performed in detecting and managing changes to a BDI solution.

FIG. 3 is an illustrative routine 300 performed in detecting and managing changes to a BDI solution. When reading the discussion of the routines presented herein, it should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in FIG. 3, and making up the embodiments of the present invention described herein are referred to variously as processes, operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims set forth herein. 100341 Referring now to FIGS. 1-4, the logical flow 300 begins at operation 302, where the integration server 104 stores declarative descriptions of an end-to-end information flow and underlying dependencies between the source information, mappings, the targets and the source-independent business applications 105 as modularized metadata in the metadata repository 108. Next at operation 304, the CDM service 207 detects one or more changes in a BDI solution. The BDI solution includes extracting, mapping, or loading source information from disparate sources 102 as one or more targets presented to one or more source-independent business applications 105 that consume the targets. The CDM service 207 also classifies the changes based on change severity.

At operation 305, the CDM service 207 analyzes which objects would be impacted by the changes. Then at operation 307, the CDM service determines whether the objects impacted by the changes can be change handled without user intervention. When the objects impacted can be change handled without user-intervention, the logical flow 300 continues from operation 307 to operation 310 where the CDM service change handles all the objects impacted by changes without user intervention when the changes are not severe. The logical flow 300 then continues to operation 317 described below.

When the impacted objects are not capable of being changed without user-intervention, the logical flow 300 continues from operation 307 to operation 312 where the CDM service 207 displays the changes. The changes displayed are organized by business area, object type, and/or change type. Next at operation 314, the CDM service 207 launches a user interface for each change handler associated with a change. The user interface is de-coupled from any logic that generates the integration services packages.

It should be appreciated as briefly described above with respect to FIG. 2b, the CDM service 207 identifies via the user interface (FIG. 4) actions that can be taken for each grouping of impacted objects. The groupings of impacted objects may include groups of heterogeneous objects whereby a change to an impacted object at one end of the end-to-end information flow can trigger a change to a heterogeneous object at the other end of the end-to-end information flow. The groups of heterogeneous objects include packets, tables, mappings, files, views, stored procedures, web services, target information, connection information, transformation information, and/or references to information. It should also be appreciated that the change to the impacted object may trigger a change to a heterogeneous object in one or more of the business applications and/or to a heterogeneous object in one or more of the disparate sources of the source information.

Still at operation 314, the CDM service 207 receives a selection of a change from the user and updates a state of the BDI solution to reflect changes that have been handled and changes yet to be handled. Next at operation 317 the CDM service 207 commits the changes to the metadata repository 108.

Then at operation 318, the CDM service 207 creates a deployable checkpoint of the metadata repository 108. The deployable checkpoint is consistent for all the changes handled in the BDI solution. Meanwhile, at operation 321, the CDM service determines whether all the changes have been handled. When one or more changes have not been handled, the logical flow 300 continues from operation 321 to operation 304 described above. When the changes have all been handled, the logical flow 300 continues to operation 318 described below.

After creating the deployable checkpoint at operation 318, the logical flow continues to operation 320 where the integration server 104 regenerates integration services packages for the objects including the targets changed in the BDI solution. The logic flow 300 then returns control to other routines at return operation 322.

Figure 4:
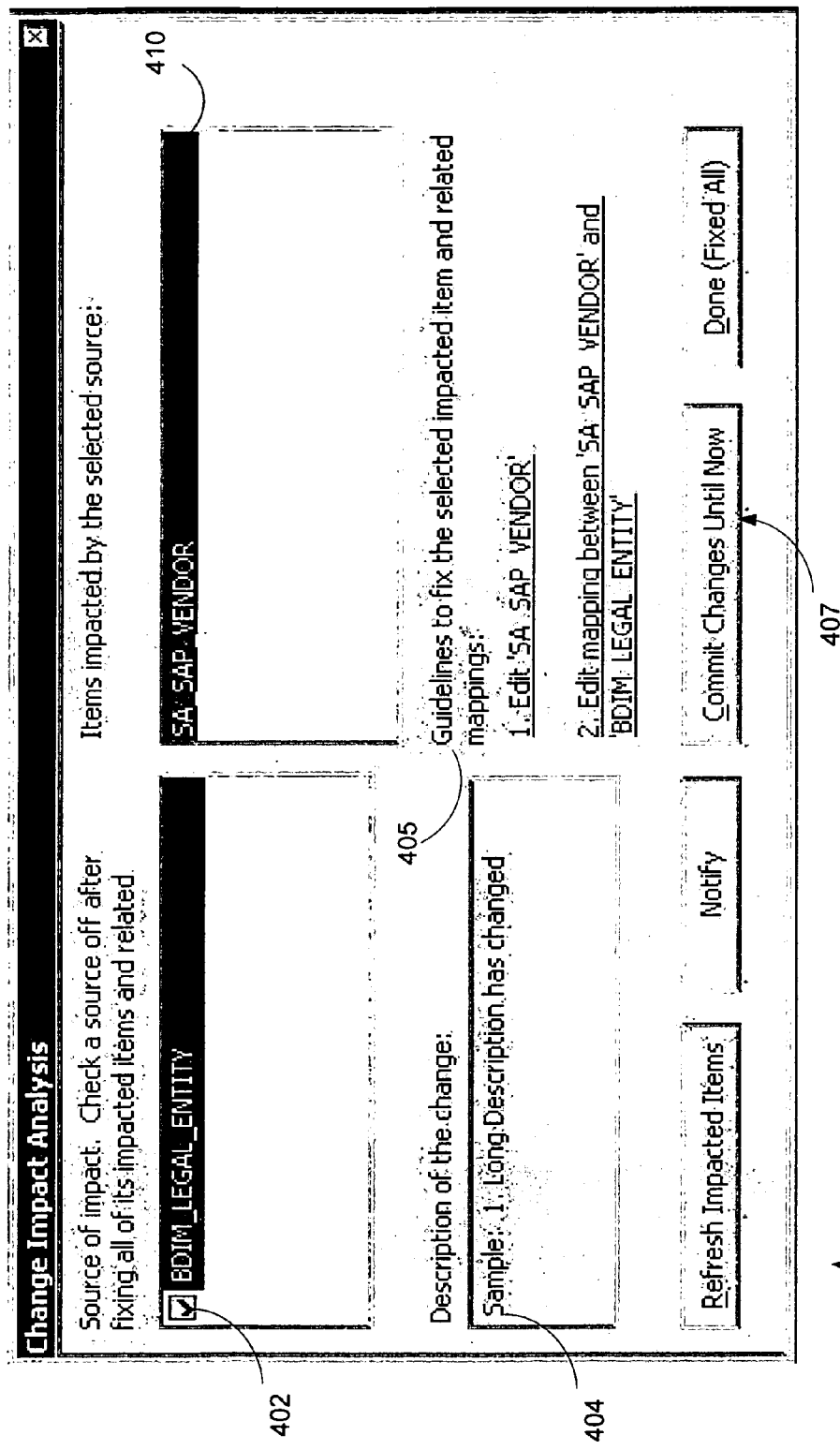
FIG. 4 illustrates a change analysis UI for selection of one or more change handlers via a client consumer computer.

FIG. 4 illustrates a change analysis UI 400 for selection of one or more change handlers via a client consumer computer. The UI 400 is a screen shot of a typical change being detected and managed by the CDM service 207 during metadata discovery. A source of impact box 402 illustrates the affected target, BDIM_LEGAL_ENTITY. A change description box 404 shows the changes to the entity selected in box 402. An impacted items box 410 shows the items impacted by the selected source in box 402 in this case, SA_SAP_VENDOR is impacted.

The guidance link section 405 illustrates the possible actions that can be taken to correctly handle the change selected in the source of impact box 402. This is typically one of two things: (i) Change a structure definition, or (ii) Change a mapping definition. The buttons on the bottom of the UI 400 allow the user to commit changes via button 407, notify another user through an email (or other means of communication) that their attention is required to handle a change, refresh the change-list, or automatically use the system-suggested way of handling the change.

Thus, the UI 400 is not simply rendering the list of things that have been changed and without allowing a viewer to connect the source of a change with a target of an impact. The UI 400 can show the source of a change, the impacted artifact because of that change, and allow an automatic fix of the impotence mismatch that was created by the change.

Exemplary Computing Environment

Figure 5:
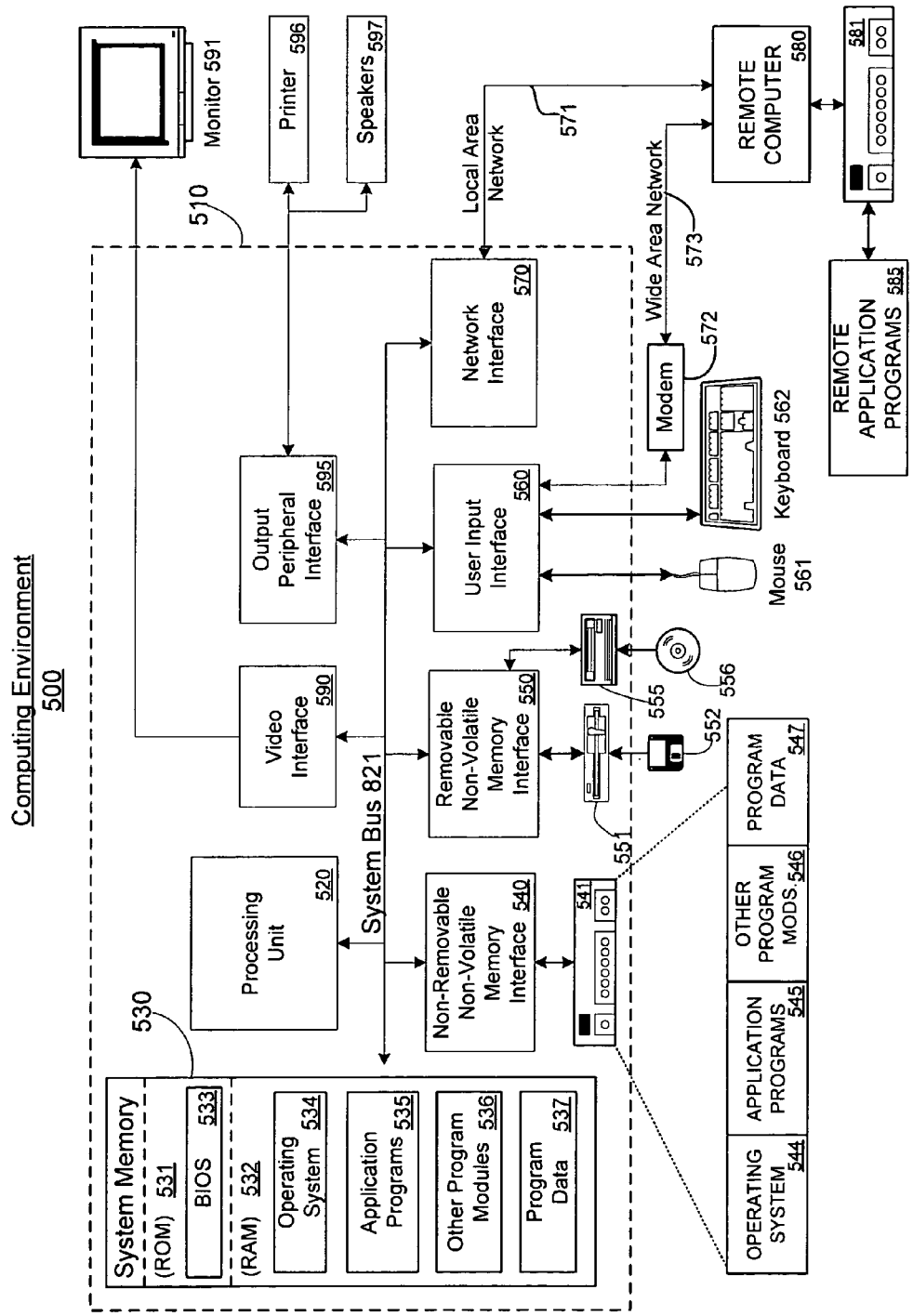
FIG. 5 illustrates an exemplary computing system.

FIG. 5 illustrates an example of a suitable computing system environment 500 in which the invention may be implemented. The computing system environment 500 is only one example of a suitable computing environment and is not intended to suggest any limitation as to the scope of use or functionality of the invention. Neither should the computing environment 500 be interpreted as having any dependency or requirement relating to any one or combination of components illustrated in the exemplary operating environment 500.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing the invention includes a general purpose computing device in the form of a computer 510. Components of computer 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 510 typically includes a variety of computer readable media. Computer readable media can be any available media that can be accessed by computer 510 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 510.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 530 includes computer storage media in the form of volatile and/or non-volatile memory such as ROM 531 and RAM 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536, and program data 537.

The computer 510 may also include other removable/non-removable, volatile/non-volatile computer storage media. By way of example only, FIG. 5 illustrates a hard disk drive 540 that reads from or writes to non-removable, non-volatile magnetic media, a magnetic disk drive 551 that reads from or writes to a removable, non-volatile magnetic disk 552, and an optical disk drive 555 that reads from or writes to a removable, non-volatile optical disk 556, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media provide storage of computer readable instructions, data structures, program modules and other data for the computer 510. In FIG. 5, for example, hard disk drive 541 is illustrated as storing operating system 544, application programs 545, other program modules 546, and program data 547. Note that these components can either be the same as or different from operating system 534, application programs 535, other program modules 536, and program data 537. Operating system 544, application programs 545, other program modules 546, and program data 547 are given different numbers here to illustrate that, at a minimum, they are different copies. A user may enter commands and information into the computer 510 through input devices such as a keyboard 562 and pointing device 561, commonly referred to as a mouse, trackball or touch pad.

Other input devices (not shown) may include a microphone, joystick, game pad, satellite dish, scanner, or the like. These and other input devices are often connected to the processing unit 520 through a user input interface 560 that is coupled to the system bus, but may be connected by other interface and bus structures, such as a parallel port, game port or a universal serial bus (USB). A monitor 591 or other type of display device is also connected to the system bus 521 via an interface, such as a video interface 590. In addition to the monitor, computers may also include other peripheral output devices such as speakers 597 and printer 596, which may be connected through an output peripheral interface 595.

The computer 510 may operate in a networked environment using logical connections to one or more remote computers, such as a remote computer 580. The remote computer 580 may be a personal computer, a server, a router, a network PC, a peer device or other common network node, and typically includes many or all of the elements described above relative to the computer 510, although only a memory storage device 581 has been illustrated in FIG. 5. The logical connections depicted include a LAN 571 and a WAN 573, but may also include other networks. Such networking environments are commonplace in offices, enterprise-wide computer networks, intranets and the internet.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the internet. The modem 572, which may be internal or external, may be connected to the system bus 521 via the user input interface 560, or other appropriate mechanism. In a networked environment, program modules depicted relative to the computer 510, or portions thereof, may be stored in the remote memory storage device. By way of example, and not limitation, FIG. 5 illustrates remote application programs 585 as residing on memory device 581. It will be appreciated that the network connections shown are exemplary and other means of establishing a communications link between the computers may be used.

As mentioned above, while exemplary embodiments of the present invention have been described in connection with various computing devices, the underlying concepts may be applied to any computing device or system. The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

Thus, the present invention is presently embodied as methods, systems, computer program products or computer readable mediums encoding computer programs for detecting and managing changes in business data integration (BDI) solutions.

While the present invention has been described in connection with the preferred embodiments of the various figures, it is to be understood that other similar embodiments may be used or modifications and additions may be made to the described embodiments for performing the same function of the present invention without deviating therefrom. Therefore, the present invention should not be limited to any single embodiment, but rather should be construed in breadth and scope in accordance with the appended claims.

We claim:

1. A method for detecting and managing changes in a business data integration (BDI) solution, comprising:
   detecting one or more changes in a BDI solution wherein the BDI solution comprises extracting, mapping, or loading source information from disparate sources as one or more targets presented to one or more source-independent business applications that consume the targets;
   classifying each of the changes based on change severity; analyzing what objects would be impacted by the changes;
   determining whether the objects impacted by the changes can be change handled without user intervention;
   change handling without user intervention all the objects impacted by changes that are not severe;
   launching a user interface for each change handler associated with a change, wherein the user interface is decoupled from any logic that generates integration services packages and wherein the user interface comprises:
   a source of impact box showing a selected source from among the disparate sources; a change description box showing changes to the selected source;
   an impacted items box showing the objects impacted by the selected source;
   a guidance link showing a plurality of actions to correctly handle the change for the selected source in the source of impact box; and
   a button for automatically utilizing a computer-suggested way of handling the change;
   committing the changes to a metadata repository; and
   creating a deployable checkpoint of the metadata repository wherein the deployable checkpoint is consistent for all the changes handled in the BDI solution;
   wherein modularized metadata stored in the metadata repository describes an end to end information flow and underlying dependencies between the source information, mappings, the targets and the source-independent business applications.

2. The method of claim 1, further comprising regenerating integration services packages for the objects comprising the targets changed in the BDI solution.

3. The method of claim 2, further comprising prior to committing the changes:
   displaying all the changes wherein the changes are organized by at least one of the following: business area, object type, or change type;
   receiving a selection of a change from the user; and
   updating a state of the BDI solution to reflect changes that have been handled and changes yet to be handled.

4. The method of claim 3, wherein displaying all the changes further comprises at least one of the following:
   displaying whether a corrective action associated with the change type has been taken;
   when the corrective action has been taken, displaying the corrective action; and
   displaying what corrective actions can be taken based on the change type or the object type.

5. The method of claim 3, further comprising:
identifying actions that can be taken for each grouping of impacted objects wherein the groupings of impacted objects may include groups of heterogeneous objects whereby a change to an impacted object at one end of the end-to-end information flow can trigger a change to a heterogeneous object at a second end of the end-to-end information flow.

6. The method of claim 5, wherein the groups of heterogeneous objects include at least two of the following: packets, tables, mappings, files, views, stored procedures, web services, target information, connection information, transformation information, and references to information at least one of within or outside the metadata repository.

7. The method of claim 5, wherein the change to the impacted object triggers at least one of the following:
a change to a heterogeneous object in one or more of the business applications; and
a change to a heterogeneous object in one or more of the disparate sources of the source information.

8. The method of claim 1, further comprising:
browsing existing line of business (LOB) source systems;
discovering metadata of LOB source system objects that are needed for the BDI solution; and
comparing the metadata of objects in the LOB source systems with assumed definitions of objects in the metadata repository, wherein the assumed definitions are at least one of the following:
discovered from a same LOB source system; and
authored as pre-defined content of the metadata and installed as part of setting up the LOB source systems for a first time;
wherein detecting the changes comprises detecting changes in the metadata of objects in the LOB source systems.

9. The method of claim 1, further comprising receiving target schema definitions wherein the target schema definitions are authored by a user of the BDI solution or imported from another source system and wherein detecting the changes comprises detecting changes in the target schema definitions.

10. The method of claim 1, further comprising modifying mapping between the source information and the targets therein changing a linkage between the source system and a target system and requiring the changes to be managed and validated wherein detecting the changes comprises detecting modifications to the mapping.

11. A computer program product comprising a computer-readable storage medium having control logic stored therein for causing a computer to detect and manage changes in a business data integration (BDI) solution, the control logic comprising computer-readable program code for causing the computer to:
detect one or more changes in a BDI solution;
classify each of the changes based on change severity;
analyze what objects are impacted by the changes;
determine whether the objects impacted by the changes can be change handled without user intervention; and
change handling without user intervention all objects impacted by changes that are not severe;
launch a user interface for each change handler associated with a change, wherein the user interface is de-coupled from any logic that generates integration services packages and wherein the user interface comprises:
a source of impact box showing a selected source from among the disparate sources;
a change description box showing changes to the selected source;
an impacted items box showing the objects impacted by the selected source;
a guidance link showing a plurality of actions to correctly handle the change for the selected source in the source of impact box; and a button for automatically utilizing a computer-suggested way of handling the change;
commit the changes to a metadata repository;
create a deployable checkpoint of the metadata repository, wherein the deployable checkpoint is consistent for all the changes handled in the BDI solution; and
regenerate in bulk, integration services packages for the objects comprising targets changed in the BDI solution;
wherein metadata stored in the metadata repository describes an end to end information flow and underlying dependencies between source information, mappings, the targets and source-independent business applications.

12. The computer program product of claim 11, further comprising computer-readable program code for causing the computer prior to committing the changes to:
display all the changes wherein the changes are organized by at least one of the following: business area, object type, or change type;
receive a selection of a change; and
update a state of the BDI solution to reflect changes that have been handled and changes yet to be handled.

13. The computer program product of claim 11, further comprising computer-readable program code for causing the computer to:
identify actions that can be taken for each grouping of impacted objects wherein the groupings of impacted objects may include groups of heterogeneous objects whereby a change to an impacted object at one end of the end-to-end information flow can trigger a change to a heterogeneous object at a second end of the end-to-end information flow.

14. The computer program product of claim 13, wherein the groups of heterogeneous objects include at least two of the following: packets, tables, mappings, files, views, stored procedures, web services, target information, connection information, transformation information, and references to information at least one of within or outside the metadata repository.

15. The computer program product of claim 13, wherein the change to the impacted object triggers at least one of the following:
a change to a heterogeneous object in one or more of the business applications; and
a change to a heterogeneous object in one or more disparate sources of the source information.

16. A system for managing changes detected in business data integration (BDI) solution, the system comprising:
a data integration server configured to:
classify each of the changes based on change severity;
analyze what objects are impacted by the changes;
determine whether the objects impacted by the changes can be change handled without user intervention;
change handling without user intervention all objects impacted by changes that are not severe;
commit the changes to a metadata repository;
create a deployable checkpoint of the metadata repository, wherein the deployable checkpoint is consistent for all the changes handled in the BDI solution; and regenerate integration services packages for the objects comprising targets changed in the BDI solution;

wherein metadata stored in the metadata repository describes an end to end information flow and underlying dependencies between source information, mappings, the targets and source-independent business applications; and at least one client computer including a display in communication with the data integration server and configured to:

display all the changes wherein the changes are organized by at least one of the following: business area, object type, or change type;

launch a user interface for each change handler associated with a change, wherein the user interface is decoupled from any logic that generates the integration services packages and wherein the user interface comprises:

a source of impact box showing a selected source from among the disparate sources;

a change description box showing changes to the selected source;

an impacted items box showing the objects impacted by the selected source;

a guidance link showing a plurality of actions to correctly handle the change for the selected source in the source of impact box; and a button for automatically utilizing a computer-suggested way of handling the change;

receive a selection of a change to handle; and update a state of the BDI solution to reflect changes that have been handled and changes yet to be handled.

17. The system of claim 16, wherein the data integration server is further configured to identify actions that can be taken for each grouping of impacted objects wherein the groupings of impacted objects may include groups of heterogeneous objects whereby a change to an impacted object at one end of the end-to-end information flow can trigger a change to a heterogeneous object at a second end of the end-to-end information flow.

* * * * *